(12) United States Patent
Prashar

(10) Patent No.: US 11,466,167 B2
(45) Date of Patent: Oct. 11, 2022

(54) INK ADDITIVES FOR IMPROVING DRY TIME AND PRINTHEAD DEHYDRATION PERFORMANCE

(71) Applicant: Memjet Technology Limited, Dublin (IE)

(72) Inventor: Jognandan Prashar, North Ryde (AU)

(73) Assignee: Memjet Technology Limited

( * ) Notice: Subject to any disclaimer, the term of this patent is extended or adjusted under 35 U.S.C. 154(b) by 357 days.

(21) Appl. No.: 16/549,629

(22) Filed: Aug. 23, 2019

(65) Prior Publication Data

US 2020/0062982 A1 Feb. 27, 2020

Related U.S. Application Data

(60) Provisional application No. 62/722,779, filed on Aug. 24, 2018.

(51) Int. Cl.
| | |
|---|---|
| *C09D 11/38* | (2014.01) |
| *C09D 11/30* | (2014.01) |
| *C09D 11/03* | (2014.01) |
| *C09K 8/60* | (2006.01) |
| *C09D 11/033* | (2014.01) |

(52) U.S. Cl.
CPC .............. *C09D 11/38* (2013.01); *C09D 11/03* (2013.01); *C09D 11/30* (2013.01); *C09K 8/602* (2013.01); *C09D 11/033* (2013.01)

(58) Field of Classification Search
CPC ........ C09D 11/38; C09D 11/033; C09K 8/602
USPC ....................................................... 523/160
See application file for complete search history.

(56) References Cited

U.S. PATENT DOCUMENTS

| | | | | |
|---|---|---|---|---|
| 5,085,698 | A | * 2/1992 | Ma | C09D 11/326 524/388 |
| 2006/0079431 | A1 | * 4/2006 | Lal | C11D 1/002 510/421 |
| 2008/0241438 | A1 | 10/2008 | Nakano et al. | |
| 2015/0105504 | A1 | * 4/2015 | Verheggen | C09D 11/38 524/108 |

FOREIGN PATENT DOCUMENTS

| | | |
|---|---|---|
| EP | 1 213 332 A1 | 6/2002 |
| WO | WO-01/05899 A1 | 1/2001 |
| WO | WO-2016/095196 A1 | 6/2016 |

OTHER PUBLICATIONS

Written Opinion of the International Searching Authority dated Oct. 30, 2019, for PCT Application No. PCT/EP2019/071276, filed on Aug. 8, 2019, 8 pages.

* cited by examiner

*Primary Examiner* — Doris L Lee
(74) *Attorney, Agent, or Firm* — Cooley LLP

(57) ABSTRACT

An inkjet ink includes: an ink vehicle; a colorant; a diethylene glycol $C_{3-8}$ alkyl ether; a first surfactant of formula (I); and a second surfactant different than the first surfactant, the first surfactant being present in a greater amount than the second surfactant.

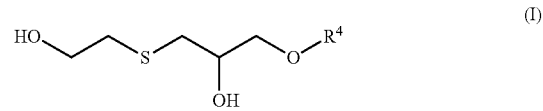

(I)

6 Claims, No Drawings

INK ADDITIVES FOR IMPROVING DRY TIME AND PRINTHEAD DEHYDRATION PERFORMANCE

CROSS-REFERENCE TO RELATED APPLICATIONS

The present application claims the benefit of priority under 35 U.S.C. § 119(e) of U.S. Provisional Application No. 62/722,779, entitled INK ADDITIVES FOR IMPROVING DRY TIME AND PRINTHEAD DEHYDRATION PERFORMANCE, filed Aug. 24, 2018, the contents of which are hereby incorporated by reference in their entirety for all purposes.

FIELD OF THE INVENTION

This invention relates to an inkjet ink. It has been developed primarily for improving dry time of ink printed on media, whilst also improving printhead dehydration performance (e.g. decap time).

BACKGROUND OF THE INVENTION

The present Applicant has developed a plethora of high-speed inkjet printers employing stationary Memjet® printheads which extend across a media width. By contrast, most other types of inkjet printer utilize a scanning printhead which traverses across the media width.

High-speed pagewidth printing necessarily places additional demands on the design of the printhead compared to traditional types of inkjet printhead. The nozzle devices must have a self-cooling design, high ink refill rates and high thermal efficiency. To this end, the Applicant has developed a range of thermal bubble-forming printheads, including those with suspended resistive heater elements (as described in, for example, U.S. Pat. Nos. 6,755,509; 7,246,886; 7,401,910; and 7,658,977, the contents of which are incorporated herein by reference) and those with embedded ("bonded") resistive heater elements (as described in, for example, U.S. Pat. Nos. 7,377,623; 7,431,431; 9,950,527; 9,283,756 and 9,994,017, the contents of which are incorporated herein by reference).

Inkjet inks require a balance of properties to control a number of different performance characteristics, such as printhead lifetime, nozzle dehydration, nozzle refill rates, dry times, print quality and print durability. Over the past 30 years or so, ink formulation chemists have developed an armory of formulation 'levers' for adjusting ink performance. For example, changes in pigment dispersions, co-solvents, surfactants and other ink additives may be used to control ink performance. However, it is often the case that attempts to improve one performance characteristic via a change of ink formulation have a deleterious effect on another performance characteristic. The goal of ink formulation is, therefore, to provide an ink having an acceptable balance of properties for a given use case.

Dry time refers to the time taken for ink to dry after being printed. Dry time is particularly important in high-speed sheet-fed printing systems where sheets of media are stacked on top of one another after printing. In addition, sheet-fed media feed mechanisms typically comprise a series of rollers for conveying media along a media feed path. The dry time of ink determines, at least to some extent, the design of the media feed path and particularly the proximity of rollers (e.g. star-wheels) downstream of the print zone. Ideally, downstream rollers are placed as closely as possible to the print zone to impart maximum control of media movement through the print zone. On the other hand, with rollers too close to the print zone, undesirable marking of the printed media (so-called 'track marks') via the rollers becomes problematic if printed ink has not dried sufficiently before coming into contact with the downstream rollers. It is therefore desirable to formulate inks with minimal dry times, especially for printing on glossy media.

While it is desirable for inks to dry quickly on media after printing, it is paradoxically also desirable for inks to dry relatively slowly when located in inkjet nozzles of the printhead. Inkjet nozzles primed with ink should preferably be ready to eject a droplet of ink with an intended trajectory and drop velocity upon actuation. However, if inkjet nozzles are unused for a period of time, there is a tendency for ink viscosity within the nozzle to increase via evaporation of water. A rise in ink viscosity undesirably causes a loss of drop directionality and/or drop velocity and a consequent loss of print quality. At worst, inkjet nozzles may become completely clogged and non-ejecting after a period of time. Typically, Memjet® printers employ a strategy of 'keep-wet spits' to maintain healthy nozzles during printing. If a particular nozzle is unused for a predetermined period of time, then it is instructed to eject a keep-wet spit, regardless of the actual image content being printed (see, for example, U.S. Pat. No. 9,434,156, the contents of which are incorporated herein by reference). With sufficiently infrequent keep-wet spits in a predetermined keep-wet pattern, the additional printed droplets, which are not part of the image content, are virtually undetectable to an unaided human eye. Nevertheless, it is still desirable to minimize the frequency of keep-wet spits in order to optimize print quality. Furthermore, it is desirable to minimize the 'decap' time of a printhead, which is the maximum time nozzles can be left uncapped without an external maintenance intervention. As used herein, the dehydration performance of a printhead refers to the minimum keep-wet spitting (KWS) frequency required for acceptable print quality (as judged by a standardized test pattern) and/or the decap time of the printhead; a lower KWS frequency or a longer decap time indicates an improved printhead dehydration performance.

U.S. Pat. No. 6,638,350 describes glycol ethers, such as diethylene glycol butyl ether (butyl diglycol) and diethylene glycol hexyl ether (hexyl diglycol) for use as penetrants in inkjet inks.

U.S. Pat. No. 7,341,985 describes thioether surfactants suitable for use in, inter alia, coatings, inks, surface cleaners, developing solutions, metalworking fluids, rinse aid formulations, laundry detergents, shampoos, conditioners, sunscreens etc.

SUMMARY OF THE INVENTION

In a first aspect, there is provided an inkjet ink comprising:
an ink vehicle;
a diethylene glycol $C_{3-8}$ alkyl ether;
a first surfactant of formula (I); and

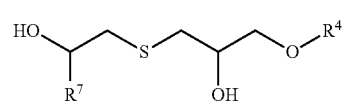

a second surfactant different than the first surfactant, wherein:
$R^4$ is $C_{4-20}$ alkyl; and
$R^7$ is selected from the group consisting of: H and $CH_2OH$ (preferably $R^7$ is H).

Inkjet inks according to the first aspect advantageously provide excellent dry times, especially on glossy media, whilst at the same providing improved printhead dehydration performance.

Preferably, the diethylene glycol $C_{3-8}$ alkyl ether is selected from the group consisting of: diethylene glycol mono-butyl ether, diethylene glycol mono-pentyl ether and diethylene glycol mono-hexyl ether.

Preferably, an amount of diethylene glycol $C_{3-8}$ alkyl ether is in the range of 0.5 to 10 wt. %. Preferably, an amount of diethylene glycol $C_{3-8}$ alkyl ether is greater than an amount of the first surfactant and greater than an amount of the second surfactant. Preferably, an amount of diethylene glycol $C_{3-8}$ alkyl ether is greater than a combined amount of the first and second surfactants.

Preferably, a surface tension of the ink is in the range of 27 to 31 mN/m, or preferably 28 to 30 mN/m.

The second surfactant may be a nonionic or anionic surfactant. Preferably the second surfactant is selected from the group consisting of: rake-type mono-alkoxylated silicone surfactants, nonionic acetylenic surfactants and di(C4-30 alkyl) sulfosuccinate surfactants.

In one embodiment, the second surfactant is a rake-type mono-alkoxylated silicone compound of formula (II):

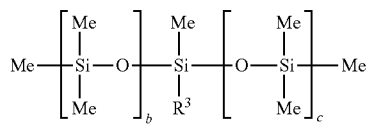

(II)

wherein:

$R^3$ is a moiety of formula (III):

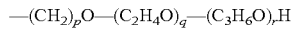

(III)

b is 1, 2, 3, 4 or 5;

c is 1, 2, 3, 4 or 5;

p is 1, 2, 3, 4 or 5;

q is 0 to 200;

r is 0 to 200; and q+r is greater than 1.

More preferably, q≠0; r≠0. For example, q may be 1 to 10 and r may be 1 to 10.

Preferably, an amount of the second surfactant is in the range of 0.01 to 0.2 wt. % or 0.02 to 0.1 wt. %. Usually, the amount of second surfactant is 0.1 wt. % or less.

Preferably, an amount of the first surfactant is in the range of 0.1 to 2 wt. % or 0.2 to 1 wt. %.

Preferably, an amount of the first surfactant is greater than an amount of the second surfactant. In some embodiments, a ratio of the first surfactant to the second surfactant is in the range of 2:1 to 20:1 or 5:1 to 15:1. Typically, the ratio is at least 5:1.

In a preferred embodiment, the second surfactant is of formula (IV):

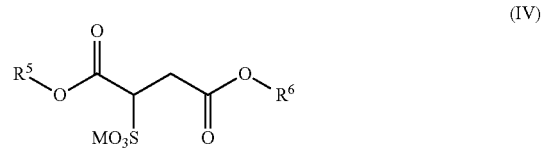

(IV)

wherein:

$R^5$ and $R^6$ are each independently selected from $C_{4-30}$ alkyl (preferably $C_{6-20}$ alkyl); and M is a metal selected from the group consisting of: Li, Na and K.

In some embodiments, the ink may comprise a third surfactant different than the first and second surfactants. The third surfactant is not particularly limited and may, for example, be selected from the group consisting of: rake-type mono-alkoxylated silicone surfactants, nonionic acetylenic surfactants and di($C_{4-30}$ alkyl) sulfosuccinate surfactants, as described herein.

Typically, a combined total amount of the first and second surfactants (or first, second and third surfactants) is in the range of 0.05 to 2 wt. %, or preferably 0.1 to 1 wt. %.

In some embodiments, the ink comprises a durability additive for improving print durability (e.g. scratch resistance and/or rubfastness). Typically, the durability additive is present in an amount ranging from 0.1 to 2 wt. %. The durability additive may be, for example, a polymer resin (e.g. acrylic resin) or an ABA-type bis-alkoxylated silicone compound. Examples of the ABA-type bis-alkoxylated silicone compound include compounds of formula (V):

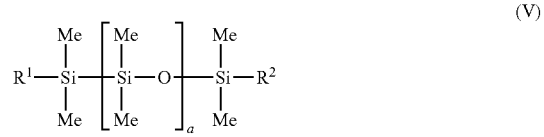

(V)

wherein:

a is 1, 2, 3, 4 or 5; and $R^1$ and $R^2$ are each independently a moiety of formula (III) as described above.

A specific example of an ABA-type bis-alkoxylated silicone compound is Dow Corning Additive 8526.

The term "alkyl" is used herein to refer to alkyl groups in both straight and branched forms, typically having from 1 to 30 carbon atoms. Unless stated otherwise, the alkyl group may also be interrupted with 1, 2 or 3 double and/or triple bonds. However, the term "alkyl" usually refers to alkyl groups having no double or triple bond interruptions. The term "alkyl" usually refers to acyclic alkyl groups, but it may also include cycloalkyl groups.

As used herein, the term "ink" is taken to mean any printing fluid, which may be printed from an inkjet printhead. The ink may or may not contain a colorant. Accordingly, the term "ink" may include conventional dye-based or pigment-based inks, infrared inks, fixatives (e.g. pre-coats and finishers), 3D printing fluids and the like. Where reference is made to fluids or printing fluids, this is not intended to limit the meaning of "ink" herein.

DETAILED DESCRIPTION OF THE INVENTION

The present inventors sought a solution to the problem of improving inkjet ink formulations for sheet-fed printers on a range of print media. In particular, the present inventors sought an ink formulation meeting the paradoxical requirements of excellent dry times and excellent printhead dehydration performance.

Initially, the effects of known penetrants were investigated for their effectiveness in reducing dry times. Formulations including a diethylene glycol mono-alkyl ether (e.g. n-butyl diglycol) were found to have significantly lower dry times compared to similar formulations lacking this penetrant. However, printhead dehydration performance appeared to be relatively poor and alternative surfactant packages were investigated for their effectiveness in lowering dry time and improving printhead dehydration performance.

Surprisingly, surfactant packages including a small-molecule thioether surfactant (e.g. Dynol™ 360, manufactured by Air Products and Chemicals, Inc.) improved both dry times and printhead dehydration performance compared to other surfactants. Surfactant packages including an additional small molecule sulfonate surfactant (e.g. BYK-3410, manufactured by BYK Japan K.K.) were found to be the most effective although surfactant packages containing alternative additional surfactants were still more effective than those containing the thioether surfactant alone.

Without wishing to be bound by theory, it is believed that the fast diffusivity or migration rates of the thioether surfactants not only enhances ink penetration into print media thereby reducing dry times, but also assists in maintaining hydrated nozzles in the printhead via a fast diffusion mechanism. Optimization of ink surface tension with an additional surfactant further improves the overall performance of the ink.

Colorant

The inks utilized in the present invention may be dye-based or pigment-based, preferably pigment-based.

Inkjet dyes will be well-known to the person skilled in the art and the present invention is not limited to any particular type of dye. By way of example, dyes suitable for use in the present invention include azo dyes (e.g. Food Black 2), metal complex dyes, naphthol dyes, anthraquinone dyes, indigo dyes, carbonium dyes, quinone-imine dyes, xanthene dyes, cyanine dyes, quinoline dyes, nitro dyes, nitroso dyes, benzoquinone dyes, naphthoquinone dyes, phthalocyanine dyes (including naphthalocyanine dyes), and metal phthalocyanine dyes (including metal naphthalocyanine dyes, such as those described in U.S. Pat. No. 7,148,345, the contents of which is herein incorporated by reference).

Examples of suitable dyes include: CI Direct Black 4, 9, 11, 17, 19, 22, 32, 80, 151, 154, 168, 171, 194 and 195; CI Direct Blue 1, 2, 6, 8, 22, 34, 70, 71, 76, 78, 86, 142, 199, 200, 201, 202, 203, 207, 218, 236 and 287; CI Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227; CI Direct Yellow 1, 2, 4, 8, 11, 12, 26, 27, 28, 33, 34, 41, 44, 48, 86, 87, 88, 132, 135, 142 and 144; CI Food Black 1 and 2; CI Acid Black 1, 2, 7, 16, 24, 26, 28, 31, 48, 52, 63, 107, 112, 118, 119, 121, 172, 194 and 208; CI Acid Blue 1, 7, 9, 15, 22, 23, 27, 29, 40, 43, 55, 59, 62, 78, 80, 81, 90, 102, 104, 111, 185 and 254; CI Acid Yellow 1, 3, 4, 7, 11, 12, 13, 14, 19, 23, 25, 34, 38, 41, 42, 44, 53, 55, 61, 71, 76 and 79; CI Reactive Blue 1, 2, 3, 4, 5, 6, 7, 8, 9, 13, 14, 15, 17, 18, 19, 20, 21, 25, 26, 27, 28, 29, 31, 32, 33, 34, 37, 38, 39, 40, 41, 43, 44 and 46; CI Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 44, 45, 46, 49, 50, 58, 59, 63, 64, and 180; CI Reactive Yellow 1, 2, 3, 4, 6 7, 11, 12, 13, 14, 15, 16, 17, 18, 22, 23, 24, 25, 26, 27, 37 and 42; CI Reactive Black 1, 3, 4, 5, 6, 8, 9, 10, 12, 13, 14 and 18; Pro-Jet® Fast Cyan 2 (Fujifilm Imaging Colorants); Pro-Jet® Fast Magenta 2 (Fujifilm Imaging Colorants); Pro-Jet® Fast Yellow 2 (Fujifilm Imaging Colorants); and Pro-Jet® Fast Black 2 (Fujifilm Imaging Colorants)

Conventional pigments suitable for use in the present invention may be inorganic pigments or organic pigments. Examples of conventional pigments are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinophthalone pigments, and metal complex pigments.

Examples of suitable pigments include: Cyan COJ450 (Cabot), D71C and D75C (Diamond Dispersions); Magenta COJ465 (Cabot), D71M, D75M, D71PV19 (Diamond Dispersions), Hostajet Magenta E-PT VP2690 and Hostajet Magenta E5B-PT VP3565 (Clariant); Yellow COJ270 and COJ470 (Cabot), or D71Y, D71Y155, D75Y (Diamond Dispersions) and Hostajet Yellow 4G-PT VP2669 (Clariant); Black CW1, CW2, CW3 (Orient) or COJ200, COJ300, COJ400 (Cabot) or SDP1000, SDP2000 (Sensient), or D71K, D75K, D77K, D80K (Diamond Dispersions) and Hostajet Black O-PT (Clariant); Red D71R (Diamond Dispersions); Blue D71B (Diamond Dispersions)

The pigments may be self-dispersing pigments, such as surface-modified pigments. The surface modification may be via either an anionic group, a cationic group or direct modification of the pigment surface. Typical surface-modifying groups are carboxylate and sulfonate groups. However, other surface-modifying groups may also be used, such as anionic phosphate groups or cationic ammonium groups.

Specific examples of suitable aqueous surface-modified pigment dispersions are Sensijet® Black SDP-2000, SDP-1000 and SDP-100 (available from Sensient Colors Inc.) and CAB-O-JET® 200, 300, 250C, 260M and 270Y (available from Cabot Corporation).

Alternatively, the pigments may be conventional pigment dispersions, which include a polymeric dispersant for encapsulating unmodified pigment particles. Examples of suitable pigment dispersions and their preparation are described in, for example, U.S. Pat. No. 9,834,694, the contents of which are incorporated herein by reference.

The average particle size of pigment particles in inkjet inks is optionally in the range of 50 to 500 nm.

Pigments and dyes may be used in inkjet inks either individually or as a combination of two or more thereof.

Ink Vehicle

The ink vehicles used in the present invention are typically conventional aqueous ink vehicles comprising at least 40 wt % water, at least 50 wt % water or at least 60 wt % water. Usually, the amount of water present in the inkjet ink is in the range of 40 wt % to 90 wt %, or optionally in the range of 50 wt % to 70 wt %.

Inks according to the present invention may further comprise co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; alkylene glycols, such as ethylene glycol, diethylene glycol, triethylene glycol and tetraethylene glycol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, □-caprolactam, dimethyl sulfoxide, morpholine, N-ethylmorpholine, 1,3-dimethyl-2-imidazolidinone and combinations thereof.

The inkjet ink may contain another high-boiling water-soluble organic solvent as a co-solvent, which can serve as a wetting agent or humectant for imparting water retentivity and wetting properties to the ink composition. Examples of high-boiling water-soluble organic solvents are 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, trimethylolpropane, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

As foreshadowed above, diethylene glycol monoalkyl ethers, such as diethylene glycol mono-n-butyl ether (n-butyl diglycol), are included in the ink vehicle from the viewpoint of improving dry times.

Typically, the total amount of co-solvent present in the ink is in the range of about 5 wt % to 60 wt %, or optionally 10 wt % to 50 wt %.

As foreshadowed above, nonionic thioether surfactants, such as those of formula (I), are included in ink vehicles from the viewpoint of improving dry times and improving dehydration performance of inkjet nozzles in the printhead.

The inkjet ink may also contain one or more other surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are di($C_{6-30}$ alkyl) sulfosuccinate sodium salt, sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N—(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate.

Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc).

Rake-type alkoxylated silicone surfactants may also be used in the formulations according to the first aspect. Specific examples of rake-type ethoxylated silicone surfactants are BYK-345, BYK-346 and BYK-349 (manufactured by BYK Japan K.K.), as well as Silface™ SAG-002, SAG-005, SAG-008, SAG-KB and SAG-503A (manufactured by Nissin Chemical Industry Co. Ltd.).

The surfactant(s) are typically present in the aqueous inkjet ink in an amount ranging from 0.05 wt. % to 2 wt % or 0.1 to 1 wt. %.

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid ("MOPS"). The amount of pH adjuster, when present, is typically in the range of from 0.01 to 2 wt. % or 0.05 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The amount of biocide, when present, is typically in the range of from 0.01 to 2 wt. % or 0.05 to 1 wt. %.

The aqueous inkjet ink may also contain a sequestering agent, such as ethylenediaminetetraacetic acid (EDTA).

Inkjet Printheads

The inks according to the present invention are primarily for use in connection with thermal inkjet printheads, although they may of course be used in other types of printhead. An exemplary type of inkjet printhead is described in, for example, U.S. Pat. Nos. 9,950,527, 9,283,756 and 9,994,017, the contents of each of which are incorporated herein by reference.

Experimental Section

Dry Time Rub Test

A folded square of unprinted media is rubbed five times across a region of solid fill printed ink. Appearance of the rubbed surface compared to an unrubbed surface were visually graded at various intervals after printing as follows: 0=unnoticeable; 1=barely noticeable; 2=moderately noticeable; 3=very noticeable; 4=extremely noticeable.

Printhead Dehydration Test Methods

Required KWS: A standard test pattern was printed using a Memjet® printhead chip. Each nozzle is configured to fire keep-wet spits (KWS) at a predetermined frequency and the test pattern analyzed for loss of print quality. The required KWS indicates a frequency at which acceptable print quality is maintained in the standard test pattern. A higher KWS frequency indicates poor dehydration performance of nozzles; a lower KWS frequency indicates good dehydration performance of nozzles.

Decap Time: A Memjet® printhead chip was used to print ink droplets and printing ceased for a predetermined period. After the predetermined period, printing was attempted from the dehydrated nozzles in the printhead chip. A maximum period (decap time) between printable droplets was measured. A shorter decap time indicates poor dehydration performance of nozzles; a longer decap time indicates good dehydration performance of nozzles.

Ink Formulations

Aqueous pigment-based inks were formulated as described in Table 1 and filtered (0.2 microns) prior to use. Ink components are shown as wt. % and all inks contained 2 ppm aluminum ions as aluminum nitrate.

TABLE 1

Ink formulations for dry time tests

| Component | Ink 1 | Ink 2 | Ink 3 |
| --- | --- | --- | --- |
| n-Butyl diglycol |  | 4.0 | 2.0 |
| Ethylene glycol | 9.5 |  |  |
| Triethylene glycol | 8.0 | 10.0 | 10.0 |
| Glycerol |  | 4.0 | 4.0 |
| 1,2-Hexanediol |  |  | 2.0 |
| Black Pigment | 5.0 | 5.0 | 5.0 |
| Emulgen™ 120[a]/ Surfynol® 104[b] (2:1) | 1.2 | 1.2 | 1.2 |
| Silface™ SAG-KB[c] | 0.05 | 0.05 | 0.05 |
| Acrylic resin | 1.0 | 1.0 | 1.0 |
| Water | balance | balance | balance | a. Emulgen™ 120 is polyoxyethylene lauryl ether, available from Kao Corporation.
b. Surfynol® 104 is a nonionic acetylenic surfactant, available from Nissin Chemical Industry Co., Ltd.
c. Silface™ SAG-KB is a rake-type mono-alkoxylated silicone surfactant, available from Nissin Chemical Industry Co., Ltd.

Inks 1-3 were tested for dry time after printing on different glossy media according to the experiment protocol described above. The results are shown in Table 2.

TABLE 2

Dry time testing on glossy media

| Black Ink | 0 seconds | 10 seconds | 20 seconds | 30 seconds | 60 seconds | 90 seconds | 120 seconds |
| --- | --- | --- | --- | --- | --- | --- | --- |
| Oce 6 mil Cast Coated 6C1G ||||||||
| Ink 1 | 3 | 2 | 2 | 1 | 1 | 1 | 1 |
| Ink 2 | 0 | 0 | 0 | 0 | 0 | 0 | 0 |
| Ink 3 | 0 | 0 | 0 | 0 | 0 | 0 | 0 |
| Fasson Demand Jet High Gloss 500 ||||||||
| Ink 1 | 3 | 2 | 2 | 2 | 1 | 0 | 0 |
| Ink 2 | 1 | 1 | 0 | 0 | 0 | 0 | 0 |
| Ink 3 | 1 | 1 | 1 | 1 | 0 | 0 | 0 |
| Raflatac Jetgloss RP #40 ||||||||
| Ink 1 | 4 | 4 | 3 | 2 | 2 | 2 | 2 |
| Ink 2 | 2 | 1 | 0 | 0 | 0 | 0 | 0 |
| Ink 3 | 4 | 1 | 1 | 1 | 0 | 0 | 0 |

The addition of n-butyl diglycol in Ink 2 and 3 dramatically improved ink dry times on all glossy media tested compared with a first baseline ink (Ink 1) containing no n-butyl diglycol.

Various inks (Inks 4-12) containing n-butyl diglycol and different surfactant packages were then formulated in order to evaluate the effects of different surfactant packages on dry times. Table 3 shows various inks formulated with different surfactant packages.

TABLE 3

Ink formulations containing alternative surfactant packages

| Component | Ink 4 | Ink 5 | Ink 6 | Ink 7 | Ink 8 | Ink 9 | Ink 10 | Ink 11 | Ink 12 |
|---|---|---|---|---|---|---|---|---|---|
| n-Butyl diglycol | 4.0 | 4.0 | 4.0 | 4.0 | 4.0 | 4.0 | 4.0 | 4.0 | 4.0 |
| Triethylene glycol | 10.0 | 10.0 | 10.0 | 10.0 | 10.0 | 10.0 | 10.0 | 10.0 | 10.0 |
| Glycerol | 4.0 | 4.0 | 4.0 | 4.0 | 4.0 | 4.0 | 4.0 | 4.0 | 4.0 |
| Black Pigment | 5.0 | 5.0 | 5.0 | 5.0 | 5.0 | 5.0 | 5.0 | 5.0 | 5.0 |
| Acrylic resin[d] | 1.0 | 1.0 | 1.0 | 1.0 | 1.0 | 1.0 | 1.0 | 1.0 | 1.0 |
| Silface ™ SAG-KB[e] | | | | | 0.05 | 0.05 | 0.1 | | |
| Surfynol ® 465[e] | 1.2 | | | | 1.2 | | | | |
| Dynol 360[f] | | 0.5 | | | | 0.5 | 0.5 | | 0.5 |
| Tegowet KL-245[g] | | | 0.5 | | | | | | |
| Tegowet 270[h] | | | | 0.5 | | | | | |
| BYK-3410[i] | | | | | | | | 0.5 | 0.05 |
| Water | balance | balance | balance | balance | balance | balance | balance | balance | balance |

[e]Surfynol ® 465 is a nonionic ethoxylated acetylenic surfactant, available from Air Products and Chemicals, Inc.
[f]Dynol ™ 360 is a thioether surfactant according to formula (I), available from Air Products and Chemicals, Inc.
[g]Tegowet ® KL-245 is a polyether siloxane surfactant, available from Evonik Industries AG.
[h]Tegowet ® 270 is a polyether siloxane surfactant, available from Evonik Industries AG.
[i]BYK-3410 is dioctyl sulfosuccinate sodium salt, available from BYK Japan K.K.

Inks 4-12 were tested for dry times after printing on glossy media according to the experiment protocol described above. Inks 4-14 were compared with a second baseline ink (Ink 2) and the results are shown in Table 4.

TABLE 4

Dry time testing on glossy media for ink formulations containing alternative surfactant packages Raflatac Jetgloss RP #40

| Black Ink | 0 seconds | 10 seconds | 20 seconds | 30 seconds | 60 seconds | 90 seconds | 120 seconds |
|---|---|---|---|---|---|---|---|
| Ink 2 | 2 | 1 | 0 | 0 | 0 | 0 | 0 |
| Ink 4 | 3 | 2 | 1 | 0 | 0 | 0 | 0 |
| Ink 5 | 3 | 2 | 1 | 1 | 1 | 0 | 0 |
| Ink 6 | 4 | 2 | 1 | 1 | 1 | 0 | 0 |
| Ink 7 | 3 | 2 | 2 | 1 | 1 | 0 | 0 |
| Ink 8 | 3 | 2 | 1 | 1 | 1 | 0 | 0 |
| Ink 9 | 1 | 0 | 0 | 0 | 0 | 0 | 0 |
| Ink 10 | 1 | 1 | 0 | 0 | 0 | 0 | 0 |
| Ink 11 | 3 | 1 | 1 | 0 | 0 | 0 | 0 |
| Ink 12 | 0 | 0 | 0 | 0 | 0 | 0 | 0 |

Inks 9, 10 and 12 were the stand out formulations having excellent dry times on glossy media and, notably, improved dry times compared to the second baseline formulation (Ink 2). Inks 9, 10 and 12 all contained Dynol™ 360 and a second surfactant (SAG-KB™ or BYK-3410™), with Ink 12 producing the best dry time results overall. Inks containing only Dynol™ 360 (Ink 5) or only BYK-3410 (Ink 11) performed relatively poorly compared to the baseline formulation (Ink 2). Inks 4, 6, 7 and 8 containing alternative surfactants all performed relatively poorly compared to the second baseline formulation (Ink 2).

The best candidate inks (Inks 9 and 12) together with the second baseline formulation (Ink 2) were taken forward for printhead dehydration testing. The results are shown in Table 5.

TABLE 5

Printhead dehydration performance of candidate inks

| | Ink 2 | Ink 9 | Ink 12 |
|---|---|---|---|
| Required KWS | 10 Hz | 7 Hz | 6 Hz |
| Decap time | 30 seconds | 120 seconds | 120 seconds |

Remarkably, Inks 9 and 13 significantly outperformed Ink 2 in printhead dehydration testing, requiring a much lower keep-wet spit (KWS) frequency and exhibiting a significantly longer decap time (4× decap time compared to Ink 2). It was therefore concluded that inks containing the synergistic combination of a diethylene glycol mono-alkyl ether, a first nonionic thioether surfactant and a second surfactant provide the unique characteristics of excellent dry times and excellent printhead dehydration performance. With a dialkyl sulfosuccinate as the second surfactant, the ink formulation was optimized in terms of both dry time and printhead dehydration performance.

It will, of course, be appreciated that the present invention has been described by way of example only and that modifications of detail may be made within the scope of the invention, which is defined in the accompanying claims.

The invention claimed is:

1. An inkjet ink comprising:
   (i) an ink vehicle;
   (ii) a diethylene glycol C3-8 alkyl ether;
   (iii) 0.5 to 1 wt. % of a first surfactant of formula (I); and

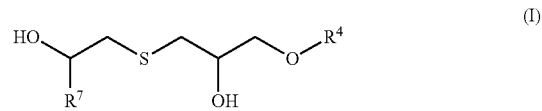

(I)

wherein:
R4 is C4-20 alkyl; and
R7 is selected from the group consisting of: H and CH2OH; and (iv) 0.02 to 0.1 wt. % of a second surfactant selected from the group consisting of:

a rake-type mono-alkoxylated silicone compound of formula (II):

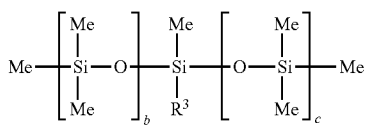
(II)

wherein:
R3 is a moiety of formula (III):

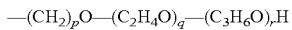
(III)

b is 1, 2, 3, 4 or 5;
c is 1, 2, 3, 4 or 5;
p is 1, 2, 3, 4 or 5;
q is 0 to 200;
r is 0 to 200; and
q+r is greater than 1;

and a sulfosuccinate of formula (IV):

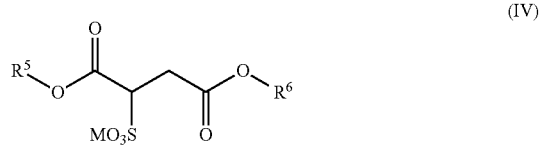
(IV)

wherein:
R5 and R6 are each independently selected from C6-20 alkyl; and
M is a metal selected from the group consisting of: Li, Na and K,
and wherein:
the first surfactant is present in a greater amount than the second surfactant; and
a surface tension of the ink is in the range of 27 to 31 mN/m.

2. The inkjet ink of claim 1, wherein a combined total amount of the first and second surfactants is in the range of 0.05 to 2 wt. %.

3. The inkjet ink of claim 1, wherein the ink comprises a durability additive selected from the group consisting of: polymer resins and an ABA-type bis-alkoxylated silicone compound.

4. The inkjet ink of claim 1 wherein the ink vehicle comprises water and one or more co-solvents.

5. The inkjet of claim 4, wherein the co-solvents include at least one penetrant selected from the group consisting of: glycol ethers and/or 1,2-alkyldiols.

6. The inkjet ink of claim 4, wherein the co-solvents include at least one of: triethylene glycol and glycerol.

* * * * *